United States Patent
Son et al.

(10) Patent No.: US 11,407,393 B2
(45) Date of Patent: Aug. 9, 2022

(54) METHOD AND APPARATUS FOR CONTROLLING VEHICLE DRIVING DEPENDING ON BABY MODE

(71) Applicants: Hyundai Motor Company, Seoul (KR); Kia Motors Corporation, Seoul (KR)

(72) Inventors: Hui Un Son, Suwon-si (KR); Sang Joon Kim, Seoul (KR); Sung Hoon Yu, Hwaseong-si (KR); Joo Young Kim, Hwaseong-si (KR); Kyu Hwan Jo, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 157 days.

(21) Appl. No.: 16/927,054

(22) Filed: Jul. 13, 2020

(65) Prior Publication Data
US 2021/0309196 A1    Oct. 7, 2021

(30) Foreign Application Priority Data

Apr. 3, 2020    (KR) .................. 10-2020-0040968

(51) Int. Cl.
*B60T 8/32*    (2006.01)
*B60W 10/18*    (2012.01)
*B60W 40/08*    (2012.01)

(52) U.S. Cl.
CPC .......... B60T 8/3255 (2013.01); B60W 10/18 (2013.01); B60W 40/08 (2013.01);
(Continued)

(58) Field of Classification Search
CPC .......... B60T 2270/10; B60T 2270/602; B60T 8/3255; B60W 10/18; B60W 20/14;
(Continued)

(56) References Cited

U.S. PATENT DOCUMENTS 6,809,643 B1 * 10/2004 Elrod ................. A61B 5/024
  701/45
8,179,274 B2 * 5/2012 Rork .................. B60N 2/002
  340/425.5
(Continued)

FOREIGN PATENT DOCUMENTS

DE    10 2015 202 919 A1    8/2016
DE    10 2017 113 314 A1    12/2017
(Continued)

OTHER PUBLICATIONS

Extended European Search Report dated Feb. 23, 2021 for European Patent Application No. 20192998.1.

*Primary Examiner* — Babar Sarwar
(74) *Attorney, Agent, or Firm* — Morgan, Lewis & Bockius LLP

(57) ABSTRACT

A vehicle driving control method depending on a baby mode, may include, when the baby mode is activated, receiving information on a state of a vehicle seat, correcting a center state of charge (SOC) value of a battery of the vehicle based on the information on the state of the vehicle seat, determining a state of a transmission of the vehicle, and performing regenerative brake and brake pedal stroke (BPS) scale/filtering correction control or an electric vehicle (EV) mode and accelerator position sensor (APS) scale/filtering correction control based on the state of the transmission of the vehicle and the state of the vehicle seat.

19 Claims, 11 Drawing Sheets

(52) U.S. Cl.
CPC ..... *B60T 2270/10* (2013.01); *B60T 2270/602* (2013.01); *B60W 2510/244* (2013.01); *B60W 2540/01* (2020.02); *B60W 2540/10* (2013.01); *B60W 2540/223* (2020.02)

(58) Field of Classification Search
CPC ......... B60W 20/15; B60W 2050/0022; B60W 2050/0026; B60W 2050/0042; B60W 2050/0052; B60W 2510/244; B60W 2540/01; B60W 2540/10; B60W 2540/12; B60W 2540/16; B60W 2540/223; B60W 2710/244; B60W 30/18036; B60W 40/08; B60W 50/10; Y02T 10/70
See application file for complete search history.

(56) References Cited

U.S. PATENT DOCUMENTS

| | | | | |
|---|---|---|---|---|
| 9,274,337 | B2* | 3/2016 | Meadows | G02B 27/017 |
| 9,569,948 | B1* | 2/2017 | Platt | G08B 21/22 |
| 10,043,364 | B2* | 8/2018 | Garcia | G08B 21/22 |
| 10,115,282 | B1* | 10/2018 | Merrill | B60Q 9/00 |
| 10,576,888 | B1* | 3/2020 | Holman | G08B 21/0266 |
| 10,629,056 | B1* | 4/2020 | Forest | G08B 21/24 |
| 2005/0225440 | A1* | 10/2005 | Simmons | G08B 21/24 |
| | | | | 340/457 |
| 2007/0296254 | A1* | 12/2007 | Kahn | B60N 2/2821 |
| | | | | 297/256.16 |
| 2010/0138113 | A1* | 6/2010 | Lee | B60R 21/01516 |
| | | | | 701/45 |
| 2011/0040451 | A1* | 2/2011 | Lee | B60R 21/0132 |
| | | | | 701/45 |
| 2011/0264317 | A1* | 10/2011 | Druenert | B60W 20/11 |
| | | | | 701/22 |
| 2014/0253314 | A1* | 9/2014 | Rambadt | G08B 21/24 |
| | | | | 340/457.1 |
| 2014/0284975 | A1* | 9/2014 | Manimbo | G08B 21/24 |
| | | | | 297/217.4 |
| 2014/0292503 | A1* | 10/2014 | Schoenberg | B60N 2/28 |
| | | | | 340/438 |
| 2014/0324261 | A1* | 10/2014 | Amano | B60L 50/61 |
| | | | | 701/22 |
| 2015/0234186 | A1* | 8/2015 | Meadows | G02B 27/017 |
| | | | | 345/8 |
| 2016/0167641 | A1* | 6/2016 | Yoon | G08G 1/09623 |
| | | | | 903/903 |
| 2016/0176409 | A1* | 6/2016 | Kirsch | B60N 2/02 |
| | | | | 701/1 |
| 2016/0236678 | A1* | 8/2016 | Upadhyay | B60N 2/002 |
| 2016/0339838 | A1* | 11/2016 | Diaz | B60N 2/2866 |
| 2017/0048376 | A1* | 2/2017 | Logan | H04L 12/2827 |
| 2017/0140583 | A1* | 5/2017 | Seibert | G07C 5/08 |
| 2017/0282791 | A1* | 10/2017 | Voorhies | G08B 21/24 |
| 2017/0368955 | A1* | 12/2017 | Zenner | B60W 20/15 |
| 2018/0009375 | A1* | 1/2018 | Miles | G08B 21/22 |
| 2019/0027011 | A1* | 1/2019 | Gordon | B60N 2/286 |
| 2019/0215672 | A1* | 7/2019 | Orris | B60H 1/00978 |
| 2019/0225114 | A1* | 7/2019 | Bellamy | B60R 11/0217 |
| 2019/0299822 | A1* | 10/2019 | Garrido | G08B 25/08 |
| 2020/0031358 | A1* | 1/2020 | Lee | B60W 30/18 |
| 2021/0082272 | A1* | 3/2021 | Morrison | G08B 21/24 |
| 2021/0101611 | A1* | 4/2021 | Jimenez | B60W 50/14 |

FOREIGN PATENT DOCUMENTS

| | | |
|---|---|---|
| DE | 10 2019 202 340 A1 | 8/2019 |
| KR | 20-0408057 Y1 | 2/2006 |
| KR | 10-2010-0113245 A | 10/2010 |
| KR | 10-2012-0059789 A | 6/2012 |
| KR | 20-0465213 Y1 | 2/2013 |
| KR | 10-1936463 B1 | 1/2019 |

* cited by examiner (a)

(b)

(a)

(b)

(c)

□ : ACCELERATION CORRECTION AMOUNT

▨ : BRAKE CORRECTION AMOUNT

| | Play Mode | Rest Mode | Sleep Mode |
|---|---|---|---|
| LOOKING-AHEAD |  |  |  |
| LOOKING-BACK |  |  |  |

: ACCELERATION CORRECTION AMOUNT

: BRAKE CORRECTION AMOUNT

| | UPHILL | DOWNHILL |
|---|---|---|
| LOOKING -AHEAD |  |  |
| LOOKING -BACK |  |  |

(a)

(b)

(a)

(b)

METHOD AND APPARATUS FOR CONTROLLING VEHICLE DRIVING DEPENDING ON BABY MODE

The present application claims priority to Korean Patent Application No. 10-2020-0040968, filed on Apr. 3, 2020, the entire contents of which is incorporated herein for all purposes by this reference.

BACKGROUND OF THE INVENTION

Field of the Invention

The present invention relates to a method and apparatus of controlling vehicle driving depending on a baby mode.

Description of Related Art

In general, a vehicle seat is a device which is separately mounted in a vehicle seat included in a vehicle and prevents a safety accident on people who are less mobile in the case of sudden braking or quick start of a vehicle or vehicle collision, and vehicle seats for infants have been widely manufactured.

In general, a vehicle seat for infants or children is a separate protection device which is additionally installed on a conventional vehicle seat to support and protect a body of an infant or a child while a vehicle travels. The vehicle seat for infants and children are installed independently from a vehicle seat and is installed to be coupled and supported using a seat belt in the vehicle.

A conventional vehicle seat for infants is recommended to be look-back installed in the case of a newborn baby. Since the head of an infant has a high weight ratio, when the vehicle seat is look-ahead installed, the head pulls the cervical spine and the spine while shaking in the case of vehicle collision, causing lethal hazards. That is, the newborn baby has a high weight ratio of the head and has undeveloped neck and back muscles, and thus, is exposed to shaken baby syndrome despite small impact.

Thus, there is a demand for technology related to influence due to sudden acceleration/sudden braking/parking impact of a vehicle for a precaution such as vehicle seat looking-back to prevent lethal hazards of infants in the case of vehicle collision.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and apparatus of controlling vehicle driving depending on a baby mode for reinforcing an electric vehicle (EV) mode and regenerative brake for correcting accelerator position sensor/brake pedal stroke (APS/BPS) scale, reinforcing filtering, and smooth acceleration and deceleration depending on a looking-ahead and looking-back installation direction of a vehicle seat.

The technical problems solved by the exemplary embodiments are not limited to the above technical problems and other technical problems which are not described herein will become apparent to those skilled in the art from the following description.

To achieve these objects and other advantages and in accordance with the present invention, as embodied and broadly described herein, a vehicle driving control method depending on a baby mode includes, when the baby mode is activated, receiving information on a state of a vehicle seat, correcting a center state of charge (SOC) value of a battery of the vehicle based on the information on the state of the vehicle seat, determining a state of a transmission of the vehicle, and performing regenerative brake and brake pedal stroke (BPS) scale/filtering correction control or an electric vehicle (EV) mode and accelerator position sensor (APS) scale/filtering correction control based on the state of the transmission of the vehicle and the state of the vehicle seat.

In various exemplary embodiments of the present invention, the correcting the center SOC value of the battery of the vehicle based on the information on the state of the vehicle seat includes down-correcting the center SOC when the vehicle seat is in a looking-ahead state.

In various exemplary embodiments of the present invention, the determining the state of the transmission of the vehicle may include determining whether the transmission of the vehicle is in an R stage when the vehicle seat is in a looking-ahead state.

In various exemplary embodiments of the present invention, the performing regenerative brake reinforcing and BPS scale/filtering correction control or EV mode reinforcing and APS scale/filtering correction control based on the state of the transmission of the vehicle and the state of the vehicle seat may include up-controlling an EV line when the transmission is in an R stage, and correcting the APS scale and filtering.

In various exemplary embodiments of the present invention, the performing regenerative brake reinforcing and BPS scale/filtering correction control or EV mode reinforcing and APS scale/filtering correction control based on the state of the transmission of the vehicle and the state of the vehicle seat includes down-controlling the center SOC and up-controlling a regenerative brake limit when the transmission is not in an R stage, and correcting the BPS scale and filtering.

In various exemplary embodiments of the present invention, the correcting the center SOC value of the battery of the vehicle based on the information on the state of the vehicle seat may include up-correcting the center SOC when the vehicle seat is in a looking-back state.

The determining the state of the transmission of the vehicle may include determining whether the transmission of the vehicle is in an R stage when the vehicle seat is in a looking-back state.

In various exemplary embodiments of the present invention, the performing regenerative brake reinforcing and BPS scale/filtering correction control or EV mode reinforcing and APS scale/filtering correction control based on the state of the transmission of the vehicle and the state of the vehicle seat includes up-controlling a regenerative brake limit when the transmission of the vehicle is in an R stage, and correcting the BPS scale and filtering.

In various exemplary embodiments of the present invention, the performing regenerative brake reinforcing and BPS scale/filtering correction control or EV mode reinforcing and APS scale/filtering correction control based on the state of the transmission of the vehicle and the state of the vehicle seat may include up-controlling an EV line when the center SOC is up-corrected and the transmission of the vehicle is not in an R stage, and correcting APS scale and filtering.

The methods and apparatuses of the present invention have other features and advantages which will be apparent

Figure 1:
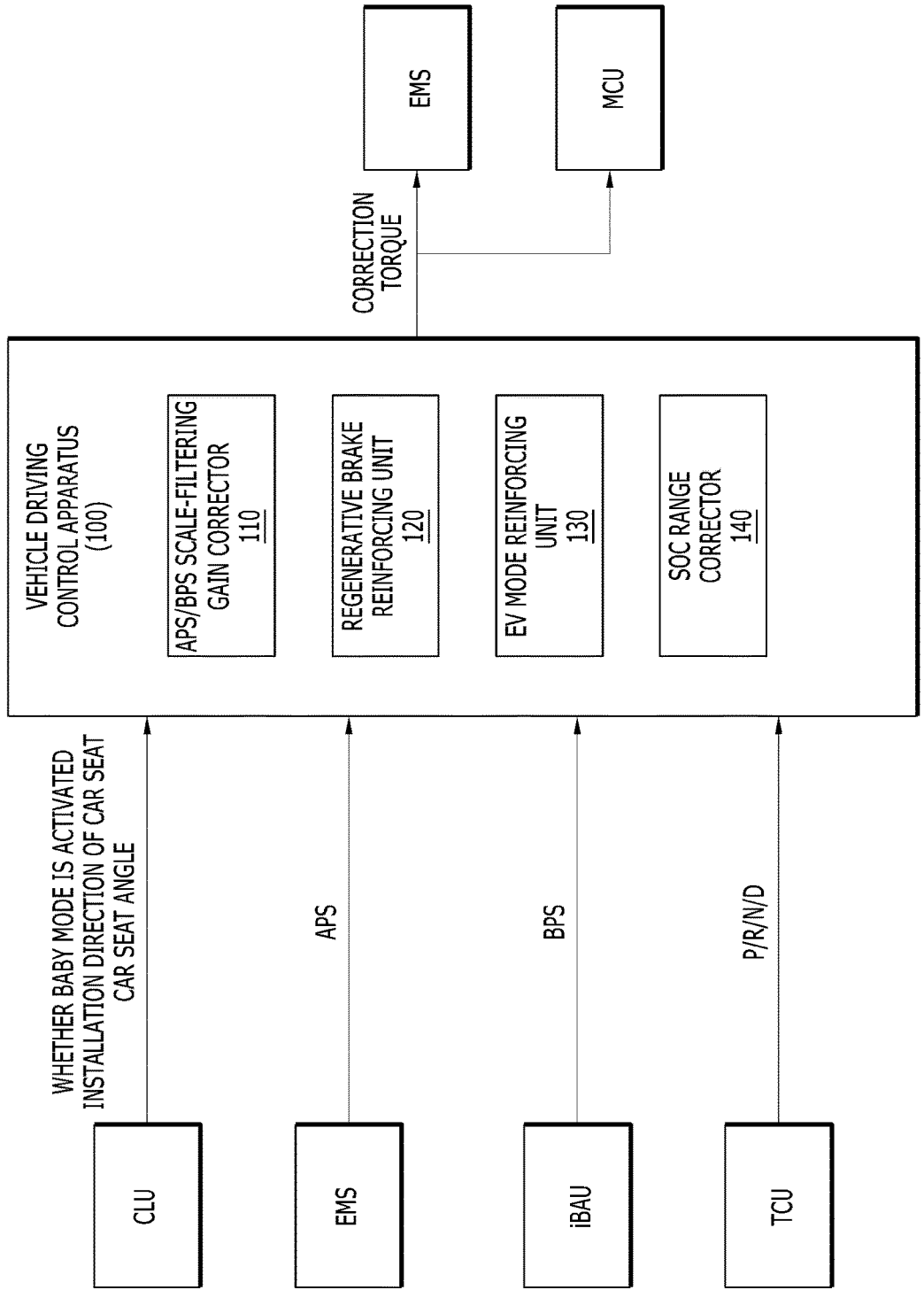
FIG. 1 is a diagram illustrating a vehicle using a vehicle driving control apparatus according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. The suffixes "module" and "unit" of elements herein are used for convenience of description and thus may be used interchangeably and do not have any distinguishable meanings or functions.

In the description of exemplary embodiments of the present invention, it will be understood that, when an element is referred to as being "on", "under", "before" or "after" another element, the element may be directly on the other element, or intervening elements may be present.

It will be understood that, although the terms "first", "second", "A", "B", "(a)", "(b)", etc. may be used herein to describe various elements of the present invention, these terms are only used to distinguish one element from another element, and the essential order or sequence of corresponding elements is not limited by these terms. It will be understood that when one element is referred to as being "connected to", "coupled to", or "accessing" another element, the one element may be "connected to" or "coupled to" or "access" the other element via a further element, or the one element may be directly connected to or directly access another element.

The terms "comprises", "includes", and "has" described herein should be interpreted not to exclude other elements but to further include such other elements since the corresponding elements may be included unless specifically mentioned otherwise. All terms including technical or scientific terms have the same meanings as those generally understood by a person having ordinary skill in the art to which an exemplary embodiment of the present invention pertains unless mentioned otherwise. Generally used terms, such as terms defined in a dictionary, should be interpreted to coincide with meanings of the related art from the context. Unless differently defined in an exemplary embodiment of the present invention, such terms should not be interpreted in an ideal or excessively formal manner.

FIG. 1 is a diagram showing a vehicle to which a vehicle driving control apparatus is applied according to an exemplary embodiment of the present invention.

Referring to FIG. 1, a vehicle driving control apparatus 100 may include an accelerator position sensor/brake pedal stroke (APS/BPS) scale-filtering gain corrector 110, a regenerative brake reinforcing unit 120, an electric vehicle (EV) mode reinforcing unit 130, and a state of charge (SoC) range corrector 140.

The vehicle driving control apparatus 100 may receive state information related to a vehicle from sensors in the vehicle.

That is, the vehicle driving control apparatus 100 may receive information on whether a baby mode is activated, vehicle seat state information, and a vehicle seat angle from a cluster (CLU), may receive accelerator position sensor (APS) information from an engine management system (EMS), may receive brake pedal stroke (BPS) information from an integrated brake assist unit (iBAU), and may receive transmission state information from a transmission control unit (TCU). The transmission state information may include a state of P/R/N/D.

The vehicle driving control apparatus 100 may receive information on whether a baby mode is activated depending on whether a vehicle seat is mounted.

When the baby mode is activated, the APS/BPS scale-filtering gain corrector 110 may receive information on a vehicle seat installation direction thereof. In the instant case, the vehicle seat installation direction may be changed in a response to whether the vehicle seat is mounted in a looking-ahead state or a looking-back state.

The APS/BPS scale-filtering gain corrector 110 may perform at least one of APS or BPS scale and filtering correction based in a state of the vehicle seat and a transmission state of the vehicle.

In various exemplary embodiments of the present invention, the APS/BPS scale-filtering gain corrector 110 may perform APS scale and filtering correction to prevent sudden acceleration when the state of the vehicle seat is a looking-back state and the transmission of the vehicle is not an R stage.

In various exemplary embodiments of the present invention, the APS/BPS scale-filtering gain corrector 110 may perform APS scale and filtering correction to prevent sudden acceleration when the state of the vehicle seat is a looking-ahead state and the transmission of the vehicle is an R stage.

In various exemplary embodiments of the present invention, the APS/BPS scale-filtering gain corrector 110 may perform BPS scale and filtering correction to prevent sudden braking when the state of the vehicle seat is a looking-ahead state and the transmission of the vehicle is not an R stage.

In various exemplary embodiments of the present invention, the APS/BPS scale-filtering gain corrector 110 may perform BPS scale and filtering correction to prevent sudden braking when the state of the vehicle seat is a looking-back state and the transmission of the vehicle is an R stage.

The regenerative brake reinforcing unit 120 may up-control a regenerative brake limit to reinforce regenerative brake whereby it is possible to relatively smoothly decelerate a vehicle when the state of the vehicle seat is a looking-ahead state and the transmission of the vehicle is not an R stage.

The regenerative brake reinforcing unit 120 may up-control a regenerative brake limit to reinforce regenerative brake whereby it is possible to relatively smoothly decelerate a vehicle when the state of the vehicle seat is a looking-back state and the transmission of the vehicle is an R stage.

The regenerative brake reinforcing unit 120 may make an engine be in passive run and may enable a Hybrid Starter Generator (HSG) to intervene in regenerative brake, increasing a regenerative brake limit. The regenerative brake reinforcing unit 120 may correct coasting torque of a vehicle. The regenerative brake reinforcing unit 120 may increase coasting torque to decelerate the vehicle by a high degree during coasting, and thus, may originally block or reduce manipulation of a brake pedal, reducing intervention of hydraulic brake.

The regenerative brake reinforcing unit 120 may perform previous SoC control when predicting a baby zone. In the instant case, the baby zone may include a zone in which acceleration and deceleration frequency occur, such as a congested road or a downtown area, or a zone in which a vehicle continuously travels upward and downward.

In various exemplary embodiments of the present invention, the regenerative brake reinforcing unit 120 may consume an SOC prior to entry into the baby zone to reinforce regenerative brake when a state of a vehicle set of the vehicle is a looking-ahead state and the vehicle is predicted to be frequently decelerated or to continuously travel downward.

The EV mode reinforcing unit 130 may up-control an EV line to reinforce an EV mode whereby it is possible to relatively smoothly accelerate the vehicle when the state of the vehicle seat is a looking-back state and the transmission of the vehicle is not an R stage.

The EV mode reinforcing unit 130 may up-control an EV line to reinforce an EV mode whereby it is possible to relatively smoothly accelerate the vehicle when the state of the vehicle seat is a looking-ahead state and the transmission of the vehicle is an R stage.

The EV mode reinforcing unit 130 may perform previous SoC control when predicting the baby zone.

In various exemplary embodiments of the present invention, the EV mode reinforcing unit 130 may charge an SOC prior to entry into the baby zone to reinforce the EV mode when the state of the vehicle seat of the vehicle is a looking-back state and the vehicle is predicted to be frequently decelerated or to continuously travel downward.

The SoC range corrector 140 may correct a center SOC value of a vehicle battery based on information on the state of the vehicle seat when the baby mode is activated.

In various exemplary embodiments of the present invention, the SoC range corrector 140 may down-correct the center SOC to reinforce regenerative brake when the vehicle seat is in a looking-ahead state.

In various exemplary embodiments of the present invention, the SoC range corrector 140 may up-correct the center SOC to reinforce the EV mode when the vehicle seat is in a looking-back state.

Figure 2:
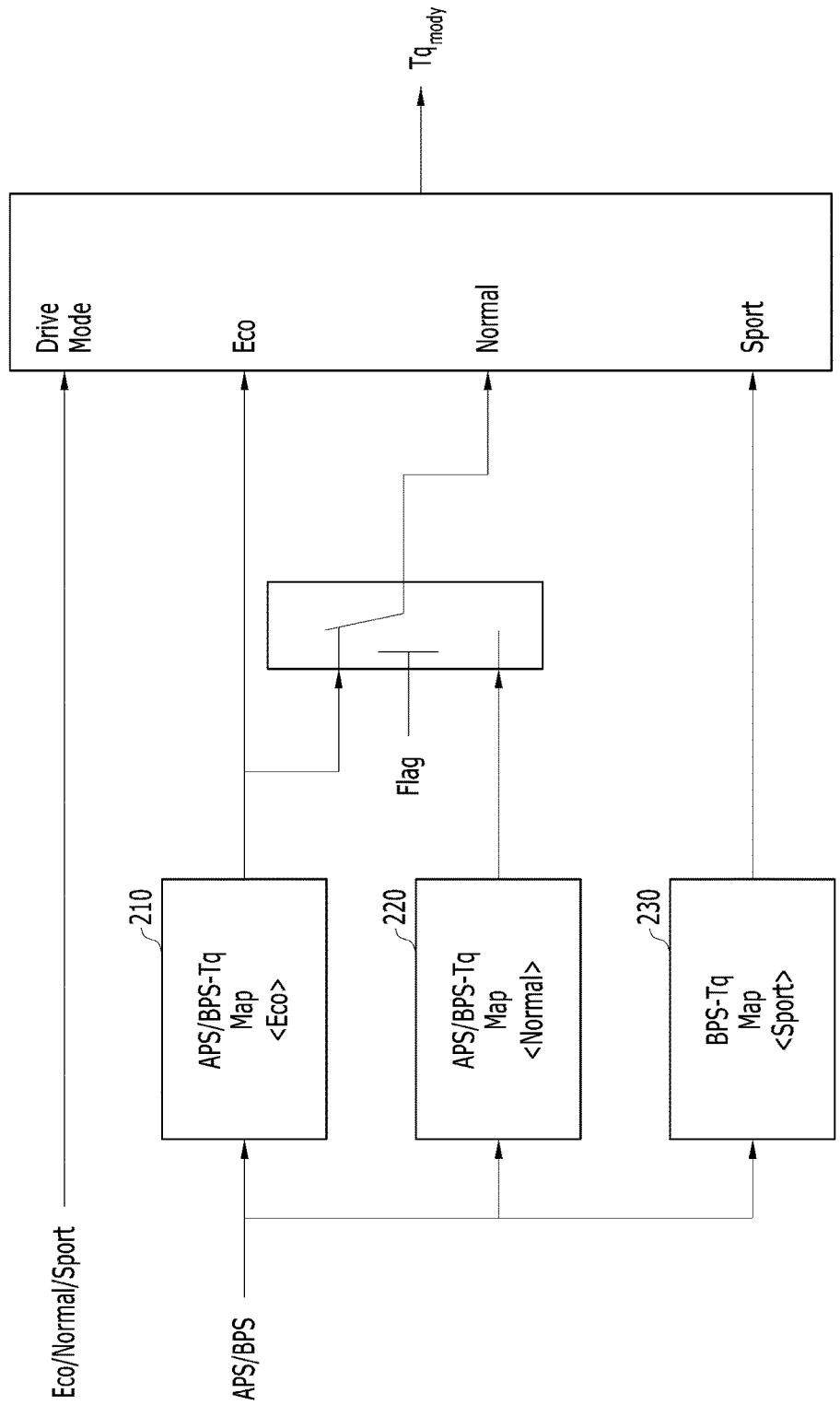
FIG. 2 and FIG. 3 are diagrams for explaining an example of accelerator position sensor/brake pedal stroke (APS/BPS) scale correction of an APS/BPS scale-filtering gain corrector according to an exemplary embodiment of the present invention.
Figure 3:
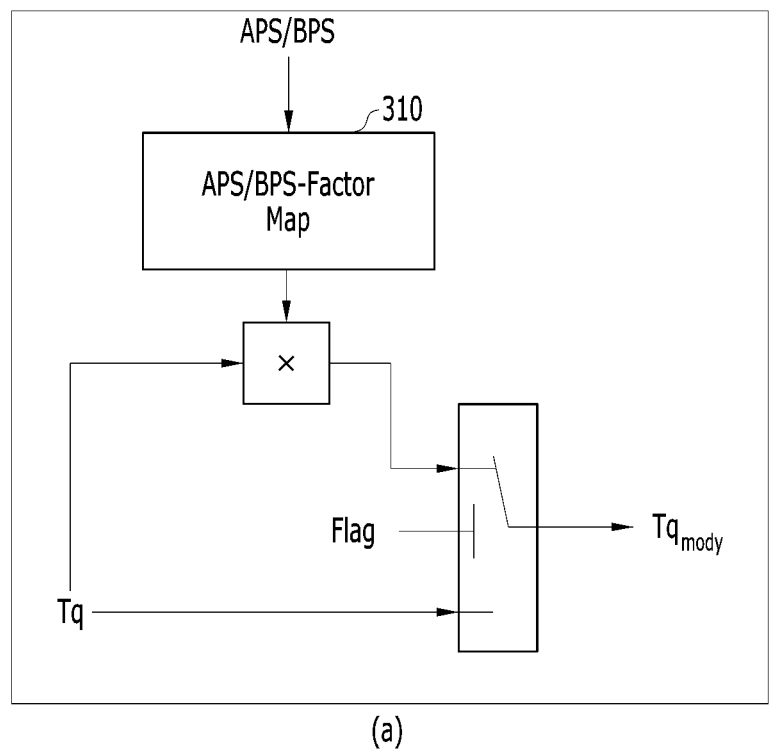
Figure 3:
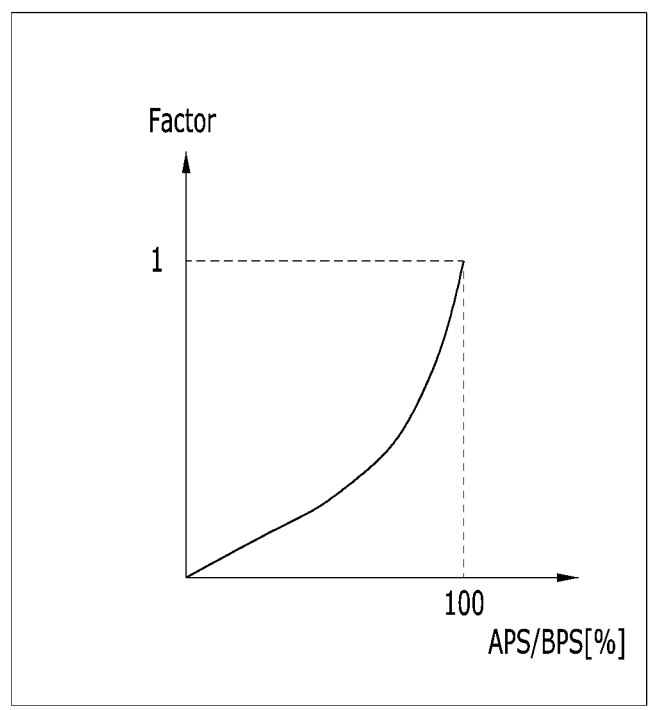

FIG. 2 and FIG. 3 are diagrams for explaining an example of APS/BPS scale correction of an APS/BPS scale-filtering gain corrector according to an exemplary embodiment of the present invention.

Referring to FIG. 2, the APS/BPS scale-filtering gain corrector 110 may perform APS/BPS scale control based on a preset APS/BPS-Tq MAP.

In the instant case, the APS/BPS-Tq MAP may include modes of an ECO MAP 210, a Normal MAP 220, and a sports MAP 230.

The APS/BPS scale-filtering gain corrector 110 may correct APS scale to prevent sudden acceleration when the state of the vehicle seat of the vehicle is a looking-back state or the state of the vehicle seat of the vehicle is a looking-ahead state and the transmission of the vehicle is an R stage.

The APS/BPS scale-filtering gain corrector 110 may correct BPS scale to prevent sudden braking when the state of the vehicle seat of the vehicle is a looking-ahead state or the state of the vehicle seat of the vehicle is a looking-back state and the transmission of the vehicle is an R stage.

Such APS/BPS scale control of the APS/BPS scale-filtering gain corrector 110 may be activated only in a normal mode among vehicle drive modes. In the instant case, the APS/BPS scale control may be corrected to scale of an Economical mode for consistency of the drivability of the vehicle and convenience of development of the vehicle.

Referring to FIG. 3A, the APS/BPS scale-filtering gain corrector 110 may control APS/BPS scale based on an APS/BPS-Factor Map 310 when controlling APS/BPS scale. Referring to FIG. 3B, in a graph of the APS/BPS-Factor Map, a vertical axis indicates a factor and a horizontal axis indicates ABS/BPS[%].

That is, the APS/BPS scale-filtering gain corrector 110 may correct APS/BPS scale irrespective of a drive mode by multiplying an original scale with a factor based on an APS/BPS value. In the instant case, Factor may be set to a ratio of Eco-Normal Map for consistency of the drivability of the vehicle and convenience of development of the vehicle.

The APS/BPS scale-filtering gain corrector 110 may differentiate between APS/BPS scale correction amounts in a response to an installation direction of the vehicle seat of the vehicle during APS/BPS scale correction.

In various exemplary embodiments of the present invention, the APS/BPS scale-filtering gain corrector 110 may correct an APS scale correction amount to be greater than BPS scale because an infant who looks back is largely affected during APS/BPS scale correction.

Figure 4:
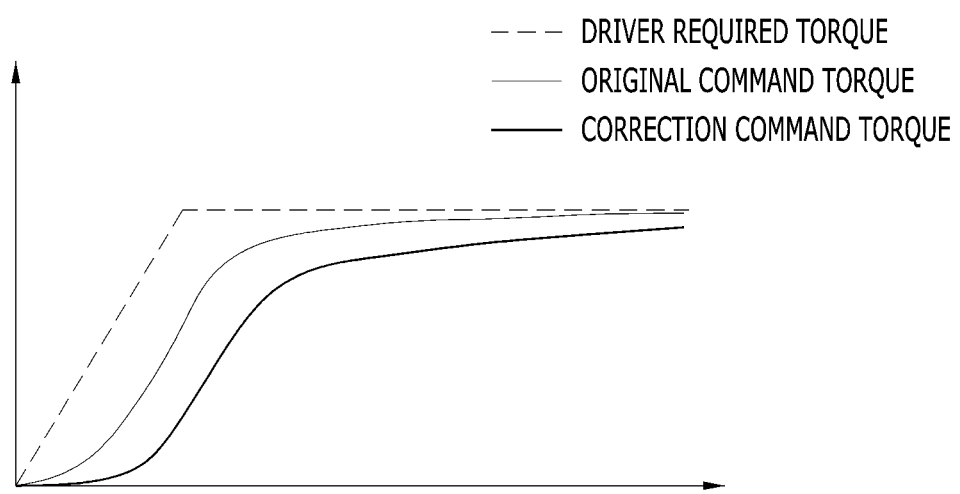
FIG. 4 is a diagram for explaining a filtering gain correction operation of an APS/BPS scale-filtering gain corrector according to an exemplary embodiment of the present invention.

FIG. 4 is a diagram for explaining a filtering gain correction operation of an APS/BPS scale-filtering gain corrector according to an exemplary embodiment of the present invention.

Referring to FIG. 4, a horizontal axis of a graph indicates a time and a vertical axis of the graph indicates torque of a vehicle.

The vehicle may generate a command torque through filtering driver required torque mainly according to APS/BPS input. This may be set in consideration of durability and drivability of a vehicle driving/braking source. The APS/BPS scale-filtering gain corrector 110 may increase the amount of a corresponding filtering (a low pass filter, a band pass filter, a rate limiter, a jerk limiter, or the like) when a baby mode is set.

Figure 5:
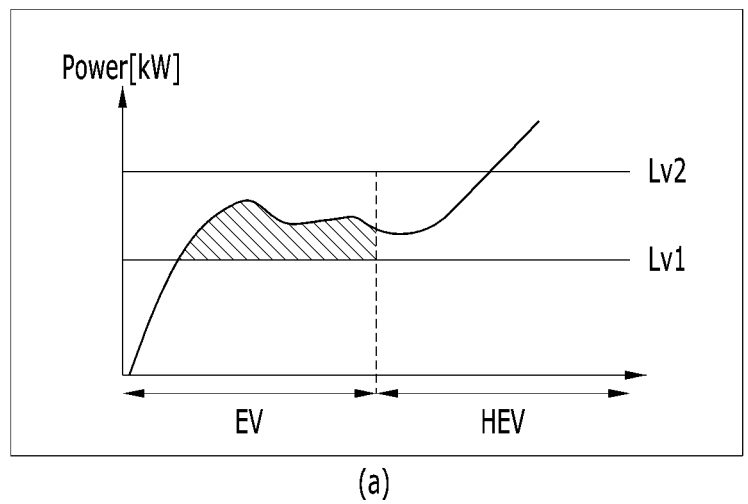
FIG. 5 is a set of diagrams showing electric vehicle (EV) control of an EV mode reinforcing unit according to an exemplary embodiment of the present invention.
Figure 5:
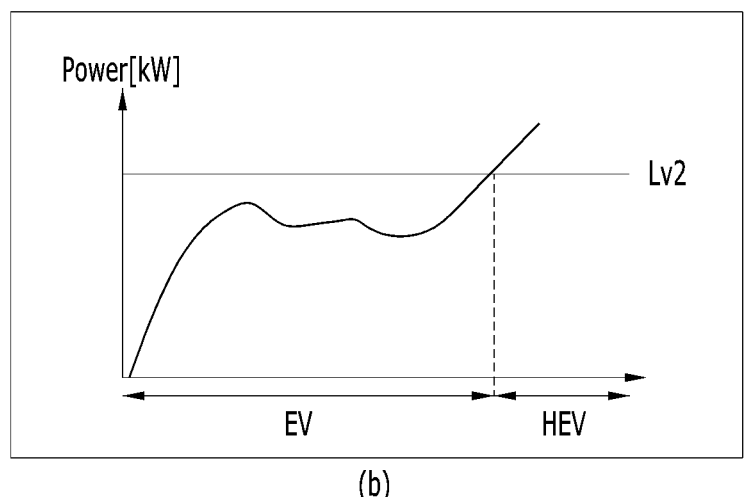
Figure 5:
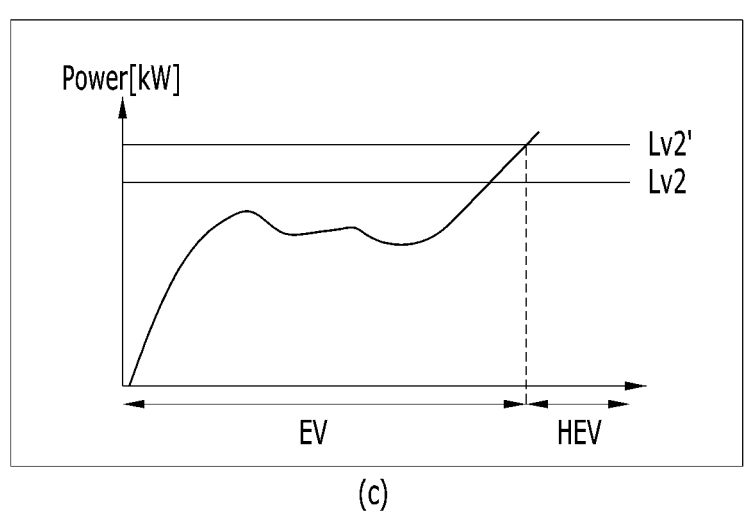

FIG. 5 is a set of diagrams showing EV control of an EV mode reinforcing unit according to an exemplary embodiment of the present invention.

Referring to FIG. 5A, the EV mode reinforcing unit 130 may control an EV line, which causes participation of an engine, in two types. A first EV line may be an Lv1 line that causes participation of the engine when required power exceeds Lv1 power and a value obtained by integrating an excessive amount is greater than a threshold value. A second EV line may be an Lv2 line that immediately causes participation of the engine when required power exceeds Lv2 power.

Referring to FIG. 5B, the EV mode reinforcing unit 130 may perform EV mode control, may increase a threshold value of an Lv1 integrated amount or may incapacitate a line during controlling control, and may cause participation of an engine to reinforce the EV mode using only the Lv2 line when a state of a vehicle seat is a looking-back state and a transmission of the vehicle is not an R stage.

Referring to FIG. 5C, the EV mode reinforcing unit 130 may up-adjust the Lv2 line to a range that does not exceed a motor power limit LV2' to reinforce the EV mode during corresponding control.

Figure 6:
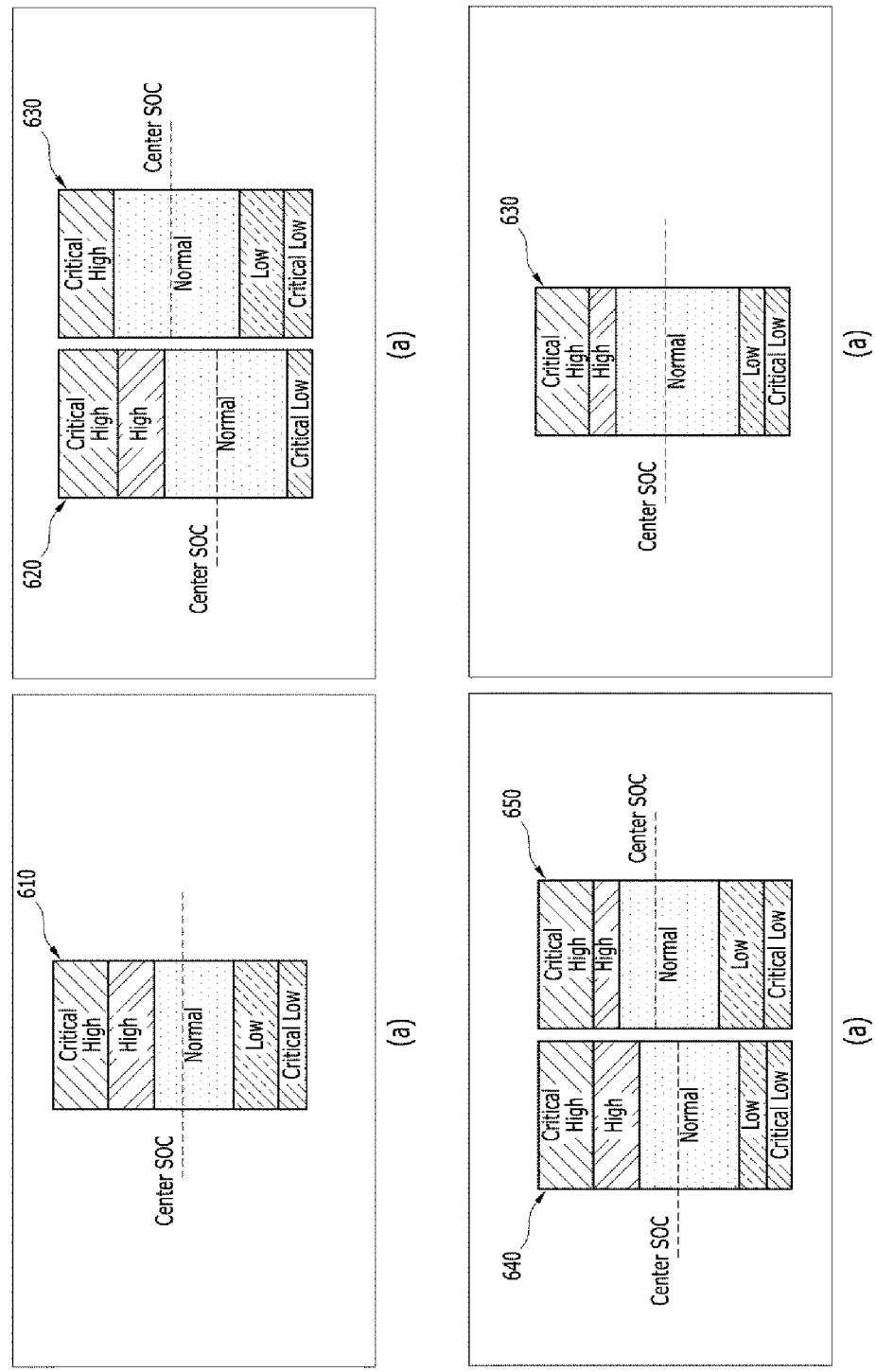
FIG. 6 is a diagram showing center state of charge (SoC) control of an SOC range corrector according to an exemplary embodiment of the present invention.

FIG. 6 is a diagram showing center SOC control of an SOC range corrector according to an exemplary embodiment of the present invention.

Referring to FIG. 6A, the SoC range corrector 140 may classify a battery SoC level as Critical Low/Low/Normal/High/Critical High and may perform control. This may be referred to as a first battery SoC state 610. In the instant case, a center portion of the Normal SoC region may be a center SoC.

The SoC range corrector 140 may differentiate between corresponding regions of a battery SoC depending on a driving environment and may control the center SoC.

Referring to FIG. 6B, when the SoC range corrector 140 reinforces regenerative brake, the SoC range corrector 140 may be controlled in a second battery SoC state 620 in which a whole Low/Normal region of the battery SoC is classified as a Normal region, and may down-correct the center SOC value of the battery.

That is, the center SOC value of the second battery SoC state 620 may be changed to a center value of a range of sum of values in the Low/Normal SoC range from a center value in a Normal SoC range of the first battery SoC state 610.

The SOC range corrector 140 may increase the Normal region of the battery SoC region through a corresponding procedure, and accordingly, may substantially reinforce regenerative brake rather than simply changing offset of the center SoC.

In contrast, when the SoC range corrector 140 reinforces an EV mode, the SoC range corrector 140 may be controlled in a third battery SoC state 630 in which a whole Normal/High region of the battery SoC is classified as a Normal region, and may up-correct the center SoC. That is, the center SOC value of the battery may be changed to a central value of the sum of values in the Normal/High SoC range from a center value of the Normal SoC range of the first battery SoC state 610.

That is, the center SOC value of the third battery SoC state 630 may be changed to a center value of partial SoC ranges of Normal and High from a center value of the Normal SOC value of the first battery SoC state 610.

The SoC range corrector 140 may increase the Normal region of the battery SoC region through a corresponding procedure, and accordingly, may substantially reinforce an EV mode rather than simply changing offset of the center SoC.

Referring to FIG. 6C, when the SOC range corrector 140 reinforces regenerative brake, the SoC range corrector 140 may be controlled in a fourth battery SoC state 640 in which the reduced region is classified as the Normal region, and may down-correct the center SOC value of the battery.

That is, the center SOC value of the fourth battery SoC state 640 may be changed to a center value of a range of summing values of the sum of values in a partial Low region and Normal SoC range from a center value in the Normal SoC range of the first battery SoC state 610.

The SoC range corrector 140 may increase the Normal region of the battery SoC region through a corresponding procedure, and accordingly, may substantially reinforce regenerative brake rather than simply changing offset of the center SoC.

In contrast, when the SoC range corrector 140 reinforces an EV mode, the SoC range corrector 140 may perform be controlled in a fifth battery SoC state 650 in which a partial High region is reduced in a battery SoC and the reduced region is classified as a Normal region, and may up-correct the center SoC. That is, the center SOC value of the fifth battery SoC state 650 may be changed to a center value of a region obtained by summing partial Normal and High SoC ranges from a center value in a Normal SoC range of the first battery SoC state 610.

The SOC range corrector 140 may increase the Normal region of the battery SoC region through a corresponding procedure, and accordingly, may substantially reinforce the EV mode rather than simply changing offset of the center SoC.

Referring to FIG. 6D, when looking-ahead and looking-back are simultaneously applied and regenerative brake and an EV mode are simultaneously reinforced, the SoC range corrector 140 may simultaneously reduce High and Low regions of a battery SoC and may be controlled in a sixth battery SoC state 660 in which the reduced region is classified as a Normal region.

That is, the center SOC value of the sixth battery SoC state 660 may be changed to a center value of the sum of partial High/Low region and Normal SoC range from a center value in the Normal SoC range of the first battery SoC state 610.

Influence of acceleration and deceleration of the vehicle is large with respect to a looking-back infant, and thus, in order reinforce an EV mode compared with regenerative brake, the Center SOC may be up-corrected to a center value of a region of the sum of partial High region and Normal SoC ranges except for Low. When the High/Low region is reduced, a High region may be further reduced compared with the Low region and may be changed to a center portion of the sum of partial High/Low regions and Normal SoC range from a center value in the Normal SoC range.

Figure 7:
FIG. 7 and FIG. 8 are diagram showing an APS/BPS correction amount in a response to an angle of a vehicle set and a road gradient according to an exemplary embodiment of the present invention.
Figure 7:
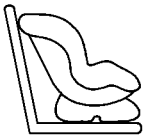
Figure 7:
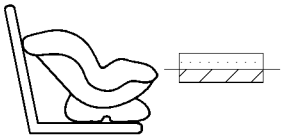
Figure 7:
Figure 7:
Figure 7:
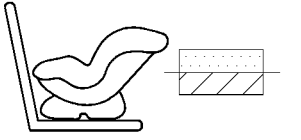
Figure 8:
Figure 8:
Figure 8:
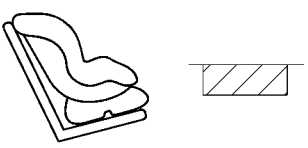
Figure 8:
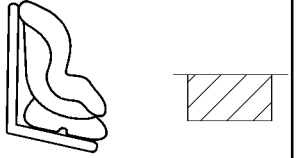
Figure 8:
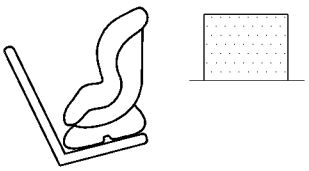
Figure 8:
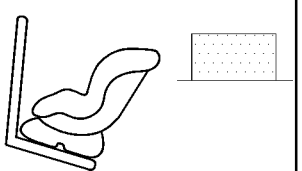

FIG. 7 and FIG. 8 are diagram showing an APS/BPS correction amount in a response to an angle of a vehicle set and a road gradient according to an exemplary embodiment of the present invention.

Referring to FIG. 7, a vehicle driving control apparatus may differentiate between APS/BPS correction degrees in consideration of vehicle seat angle setting.

The angle of the vehicle seat may be changed according to a corresponding setting mode. For example, the setting mode may include a Play Mode, a Rest Mode, and a Sleep Mode and may be subdivided or may be reduced.

The installation angle of the vehicle seat may be increased in the order of the Play Mode, the Rest Mode, and the Sleep Mode. That is, when the vehicle seat is erected, influence on the infant due to acceleration and deceleration is increased, and thus, the angle may be further corrected, and when the vehicle seat is laid downwards, influence on the infant is reduced, and thus, the angle may be less corrected. When the vehicle seat is laid downwards, a belt of the infant may be unfastened, the infant loses his or her posture, and the infant's head deviates from the vehicle seat due to rapid acceleration and deceleration, and thus, the angle may be corrected in an opposite direction thereof.

Referring to FIG. 8, the vehicle driving control apparatus may differentiate between correction degrees in consideration of a longitudinal gradient of a road.

When a current state is an uphill state in which a road is an uphill road and a state of a vehicle seat is a looking-back state, the current state is a state in which the body of an infant is already inclined forward, and thus, the vehicle driving control apparatus may increase an acceleration correction degree and may alleviate additional leaning.

When the current state is a downhill state in which a road is a downhill road and the state of the vehicle seat is a looking-ahead state, the current state is a state in which the body of the infant is already inclined forward, and thus, the vehicle driving control apparatus may increase a brake correction degree and may alleviate additional leaning.

Figure 9:
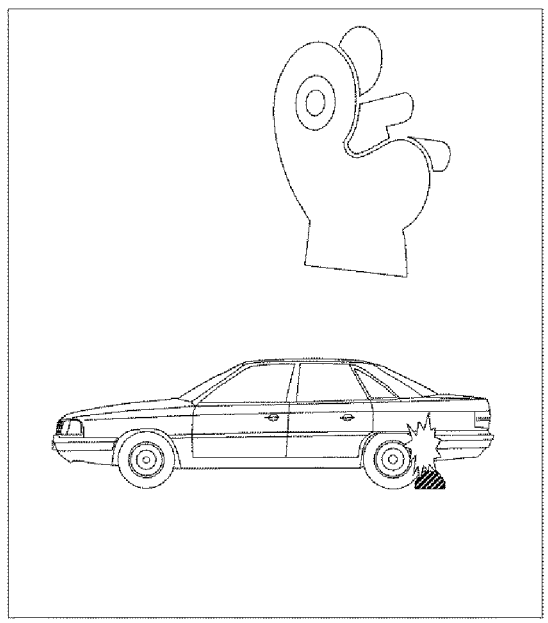
FIG. 9 is a diagram illustrating torque correction control for reduction in impact due to a parking bump while a vehicle parks according to an exemplary embodiment of the present invention.
Figure 9:
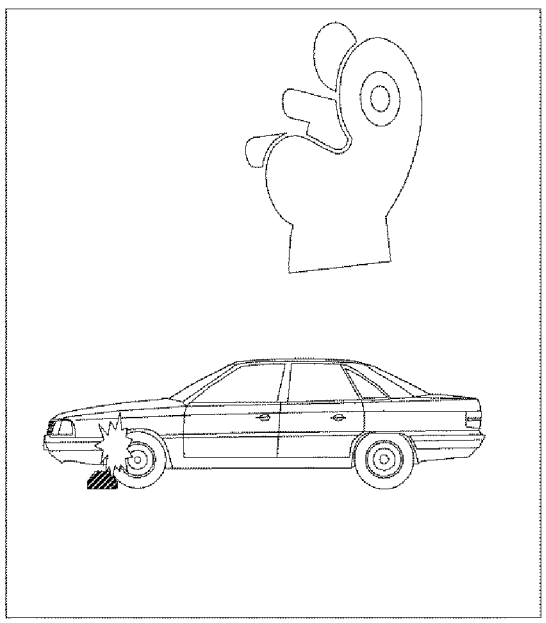

FIG. 9 is a diagram illustrating torque correction control for reduction in impact due to a parking bump while a vehicle parks according to an exemplary embodiment of the present invention.

When detecting the parking bump, the vehicle driving control apparatus may determine creep torque for alleviating impact based on the state of the vehicle seat and a driving situation and may control creep torque according to a parking situation and parking bump detection.

Thus, as shown in FIG. 9A, when the state of a vehicle seat mounted in the vehicle is a looking-back state and a transmission of the vehicle is an R stage for reverse parking, if when the vehicle detects a parking bump, creep torque may be corrected and controlled for reduce impact, reducing impact due to the parking bump.

As shown in FIG. 9B, when the state of the vehicle seat disposed in the vehicle is a looking-ahead state and the transmission of the vehicle is a D stage for forward parking, if when the vehicle detects the parking bump, creep torque may be corrected and controlled for reduce impact, reducing impact due to the parking bump.

Figure 10:
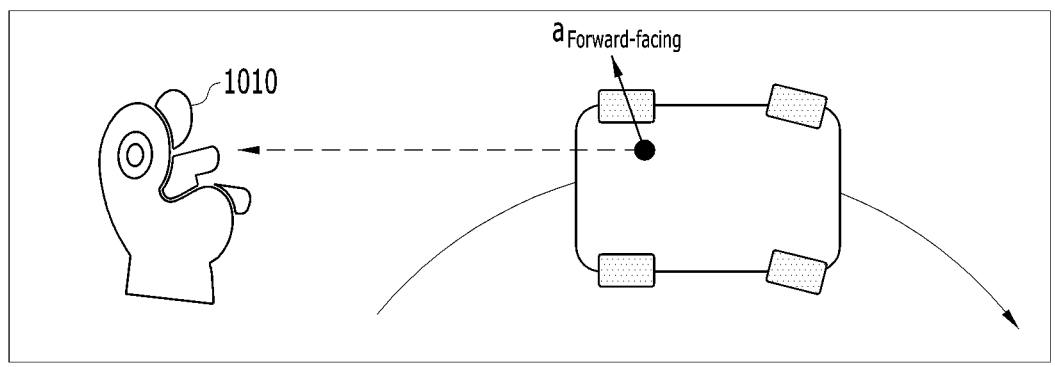
FIG. 10 is a diagram showing acceleration depending on a state of a vehicle seat according to an exemplary embodiment of the present invention.
Figure 10:
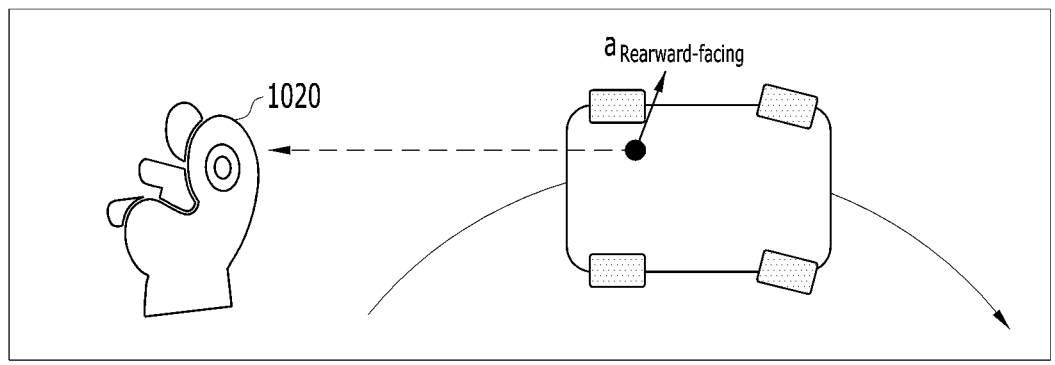

FIG. 10 is a diagram showing torque correction control for reducing impact due to a parking bump while a vehicle parks according to an exemplary embodiment of the present invention.

FIG. 10 is a diagram showing acceleration depending on a state of a vehicle seat according to an exemplary embodiment of the present invention.

Referring to FIG. 10, a correction and filtering amount of acceleration/braking amount in a response to driver input may be controlled to prevent the head of an infant from departing from a vehicle seat when a vehicle turns.

Referring to FIG. 10A, when the vehicle travels in a turning section and a vehicle seat disposed in the vehicle is in a looking-ahead state 1010 in which a turning direction of the vehicle is the same as a front side of the vehicle seat, the vehicle driving control apparatus may correct a braking amount and may reinforce filtering while the vehicle turns.

That is, when the vehicle turns, the vehicle may be decelerated depending on the braking amount which is corrected while the vehicle travels in the turning section to prevent acceleration to the vehicle seat in a forward direction (a Forward-facing).

Referring to FIG. 10B, when the vehicle travels in a turning section and a vehicle seat mounted in the vehicle is in a looking-back state 1020 in which a turning direction of the vehicle is opposite to a front side of the vehicle seat, the vehicle driving control apparatus may correct an acceleration amount and may reinforce filtering while the vehicle turns.

That is, when the vehicle turns, the vehicle may be accelerated depending on the acceleration amount which is corrected while the vehicle travels in the turning section to prevent acceleration to the vehicle seat in a rearward direction (a_rearward-facing).

Figure 11:
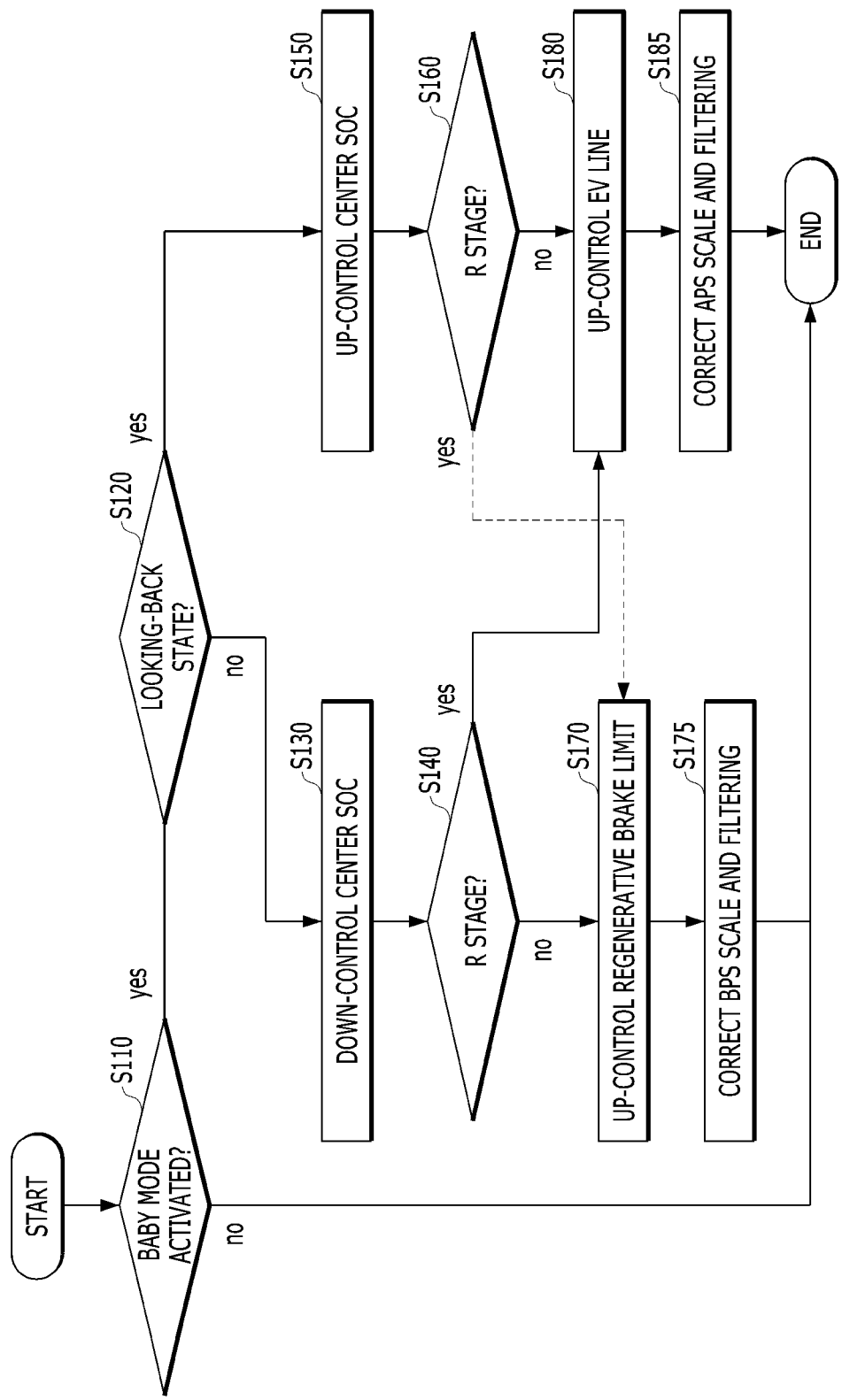
FIG. 11 is a flowchart showing a vehicle driving control method depending on a baby mode according to an exemplary embodiment of the present invention.

FIG. 11 is a flowchart showing a vehicle driving control method depending on a baby mode according to an exemplary embodiment of the present invention.

Referring to FIG. 11, the vehicle driving control apparatus 100 may determine whether the baby mode of the vehicle is activated (S110).

After operation S110, when the baby mode is activated, the vehicle driving control apparatus 100 may determine whether the vehicle seat is in a looking-back state (S120).

After operation S120, when the vehicle seat is not in a looking-back state (NO of S120), the vehicle driving control apparatus 100 may down-control a center SOC value of a battery SOC value of the vehicle (S130).

After operation S130, the vehicle driving control apparatus 100 may determine whether a transmission of the vehicle is in an R stage (S140).

After operation S130, when the vehicle seat is not in a looking-back state and the transmission of the vehicle is not in the R stage (NO of S140), the vehicle driving control apparatus 100 may up-control a regenerative brake limit (S170).

After operation S170, the vehicle driving control apparatus 100 may correct BPS scale and filtering (S175).

After operation S140, when the vehicle seat is not in a looking-back state and the transmission of the vehicle is in the R stage (YES of S140), the vehicle driving control apparatus 100 may up-control an EV line (S180).

After operation S180, the vehicle driving control apparatus 100 may correct APS scale and filtering (S185).

After operation S120, when the vehicle seat is in a looking-back state (YES of S120), the vehicle driving control apparatus 100 may up-control a center SOC value of a battery SOC value of the vehicle (S150).

After operation S150, the vehicle driving control apparatus 100 may determine whether the transmission of the vehicle is in an R stage (S160).

After operation S160, when the vehicle seat is in a looking-back state and the transmission of the vehicle is in the R stage (YES of S160), the vehicle driving control apparatus 100 may up-control a regenerative brake limit (S170).

After operation S170, the vehicle driving control apparatus 100 may correct BPS scale and filtering (S175).

After operation S160, when the vehicle seat is in a looking-back state and the transmission of the vehicle is not in the R stage (NO of S160), the vehicle driving control apparatus 100 may up-control an EV line (S180).

After operation S180, the vehicle driving control apparatus 100 may correct APS scale and filtering (S185).

A vehicle driving control method depending on a baby mode according to an exemplary embodiment of the present invention may control an ABP/BPS scale and filtering correction amount and may control an EV mode and a regenerative brake limit in a response to a looking-ahead and looking-back installation direction of the vehicle seat, and accordingly, ride comport and stability of infants may be advantageously enhanced.

It will be appreciated by persons skilled in the art that the effects that could be achieved with the present invention are not limited to what has been described hereinabove and other advantages of the present invention will be more clearly understood from the detailed description.

In an exemplary embodiment of the present invention, the vehicle driving control apparatus 100 may refer to a controller having a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a non-volatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The aforementioned method according to exemplary embodiments may also be embodied as computer readable code on a computer readable recording medium. Examples of the computer readable recording medium include read-only memory (ROM), random-access memory (RAM), CD-ROMs, magnetic tapes, floppy disks, optical data storage devices, etc. Also, functional programs, code, and code segments for accomplishing the present invention may be easily construed by programmers skilled in the art to which an exemplary embodiment of the present invention pertains.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle driving control method depending on a baby mode, the method comprising:
   in a response that the baby mode is activated, receiving information on a state of a vehicle seat;
   correcting a center state of charge (SOC) value of a battery of a vehicle according to the information on the state of the vehicle seat;
   determining a state of a transmission of the vehicle; and
   performing regenerative brake and brake pedal stroke (BPS) scale/filtering correction control or an electric vehicle (EV) mode and accelerator position sensor (APS) scale/filtering correction control according to the state of the transmission of the vehicle and the state of the vehicle seat.

2. The method of claim 1, wherein the correcting the center SOC value of the battery of the vehicle according to the information on the state of the vehicle seat includes down-correcting the center SOC value upon determining that the vehicle seat is in a looking-ahead state.

3. The method of claim 2, wherein the performing regenerative brake reinforcing and BPS scale/filtering correction control or EV mode reinforcing and APS scale/filtering correction control according to the state of the transmission of the vehicle and the state of the vehicle seat includes:
   up-controlling an EV line in a response that the transmission is in an R stage; and
   correcting an APS scale and filtering in the response that the transmission is in the R stage.

4. The method of claim 2, wherein the performing regenerative brake reinforcing and BPS scale/filtering correction control or EV mode reinforcing and APS scale/filtering correction control according to the state of the transmission of the vehicle and the state of the vehicle seat includes:
   down-controlling the center SOC and up-controlling a regenerative brake limit in a response that the transmission is not in an R stage; and
   correcting a BPS scale and filtering in the response that the transmission is not in the R stage.

5. The method of claim 1, wherein the determining the state of the transmission of the vehicle includes determining when the transmission of the vehicle is in an R stage in a response that the vehicle seat is in a looking-ahead state.

6. The method of claim 1, wherein the correcting the center SOC value of the battery of the vehicle according to the information on the state of the vehicle seat includes up-correcting the center SOC in a response that the vehicle seat is in a looking-back state.

7. The method of claim 6, wherein the performing regenerative brake reinforcing and BPS scale/filtering correction control or EV mode reinforcing and APS scale/filtering correction control according to the state of the transmission of the vehicle and the state of the vehicle seat includes:
  up-controlling a regenerative brake limit in a response that the transmission of the vehicle is in an R stage; and
  correcting a BPS scale and filtering in the response that the transmission of the vehicle is in the R stage.

8. The method of claim 6, wherein the performing regenerative brake reinforcing and BPS scale/filtering correction control or EV mode reinforcing and APS scale/filtering correction control according to the state of the transmission of the vehicle and the state of the vehicle seat includes:
  up-controlling an EV line in a response that the center SOC is up-corrected and the transmission of the vehicle is not in an R stage; and
  correcting APS scale and filtering in the response that the center SOC is up-corrected and the transmission of the vehicle is not in the R stage.

9. The method of claim 1, wherein the determining the state of the transmission of the vehicle includes determining when the transmission of the vehicle is in an R stage in a response that the vehicle seat is in a looking-back state.

10. A non-transitory computer-readable recording medium having recorded thereon a program for executing the method of claim 1.

11. A vehicle driving control apparatus of receiving information on activation of a baby mode, information on a state of a vehicle seat, and information on a transmission of a vehicle, the vehicle driving control apparatus comprising:
  a controller including a memory and a processor,
  wherein the controller is configured to correct a center state of charge (SOC) value of a battery of the vehicle according to the information on the state of the vehicle seat;
  wherein the controller is configured to up-control a regenerative brake limit in a response to the center SOC value of the battery of the vehicle;
  wherein the controller is configured to up-control an EV line in a response to the center SOC value of the battery of the vehicle; and
  wherein the controller is configured to perform regenerative brake reinforcing and BPS scale/filtering correction control or EV mode reinforcing and APS scale/filtering correction control according to the state of the transmission of the vehicle and the state of the vehicle seat.

12. The apparatus of claim 11, wherein the controller down-corrects the center SOC value upon determining that the vehicle seat is in a looking-ahead state.

13. The apparatus of claim 12, wherein the controller corrects an APS scale and filtering in a response that the transmission is in an R stage.

14. The apparatus of claim 12, wherein the controller corrects a BPS scale and filtering in a response that the transmission is not in an R stage.

15. The apparatus of claim 11, wherein the controller is configured to determine when the transmission of the vehicle is in an R stage in a response that the vehicle seat is in a looking-ahead state.

16. The apparatus of claim 11, wherein the controller up-corrects the center SOC in a response that the vehicle seat is in a looking-back state.

17. The apparatus of claim 16, wherein the controller corrects a BPS scale and filtering in a response that the transmission of the vehicle is in an R stage.

18. The apparatus of claim 16, wherein the controller up-corrects the center SOC and corrects the APS scale and filtering in a response that the transmission of the vehicle is not in an R stage.

19. The apparatus of claim 11, wherein the controller determines when the transmission of the vehicle is in an R stage in a response that the vehicle seat is in a looking-back state.

* * * * *